(12) United States Patent
Park et al.

(10) Patent No.: US 10,366,527 B2
(45) Date of Patent: Jul. 30, 2019

(54) THREE-DIMENSIONAL (3D) IMAGE RENDERING METHOD AND APPARATUS

(71) Applicant: SAMSUNG ELECTRONICS CO., LTD., Suwon-si (KR)

(72) Inventors: Juyong Park, Seongnam-si (KR); Dong Kyung Nam, Yongin-si (KR); Seok Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 15/477,269

(22) Filed: Apr. 3, 2017

(65) Prior Publication Data

US 2018/0144537 A1 May 24, 2018

(30) Foreign Application Priority Data

Nov. 22, 2016 (KR) .................. 10-2016-0155647

(51) Int. Cl.
*G09G 5/14* (2006.01)
*G06T 15/00* (2011.01)
*H04N 13/00* (2018.01)

(52) U.S. Cl.
CPC ............. *G06T 15/005* (2013.01); *G09G 5/14* (2013.01); *H04N 13/00* (2013.01)

(58) Field of Classification Search
CPC .. G02B 27/225; G02B 27/2214; H04N 13/32; H04N 13/302; G02F 1/133526; G06T 15/005; G06T 15/06; G06T 2207/10012; G09G 5/14
See application file for complete search history.

(56) References Cited

U.S. PATENT DOCUMENTS

| 8,890,865 | B2 | 11/2014 | Park et al. | |
|---|---|---|---|---|
| 2004/0150583 | A1* | 8/2004 | Fukushima | H04N 13/31 345/6 |
| 2013/0293547 | A1 | 11/2013 | Du et al. | |
| 2014/0049622 | A1* | 2/2014 | Tsurumi | H04N 13/31 348/54 |
| 2016/0026253 | A1* | 1/2016 | Bradski | G02B 27/225 345/8 |
| 2017/0070727 | A1* | 3/2017 | Chen | G02B 27/2214 |
| 2017/0155893 | A1* | 6/2017 | Mather | G02B 27/2214 |

FOREIGN PATENT DOCUMENTS

| JP | 2012181825 A | 9/2012 |
|---|---|---|
| JP | 2013101340 A | 5/2013 |
| KR | 20020031179 A | 4/2002 |
| KR | 1020140079101 A | 6/2014 |

OTHER PUBLICATIONS

Jung et al: "Numerical simulation of the displayed image on the entire screen of autostereoscopic displays", Mar. 23, 2015, vol. 23, No. 6, Optics Express, pp. 7842-7855 (14 pages total).

\* cited by examiner

*Primary Examiner* — Diane M Wills
(74) *Attorney, Agent, or Firm* — Sughrue Mion, PLLC

(57) ABSTRACT

A three-dimensional (3D) image rendering method and an apparatus are provided. The 3D image rendering method includes determining intersection points between candidate rays and an optical layer based on a first refractive index of a first medium that is disposed between a display panel and the optical layer and a second refractive index of a second medium that is outside a 3D display apparatus, and assigning a pixel value to a pixel of the display panel based on respective distances between the intersection points and optical elements of the optical layer.

16 Claims, 12 Drawing Sheets

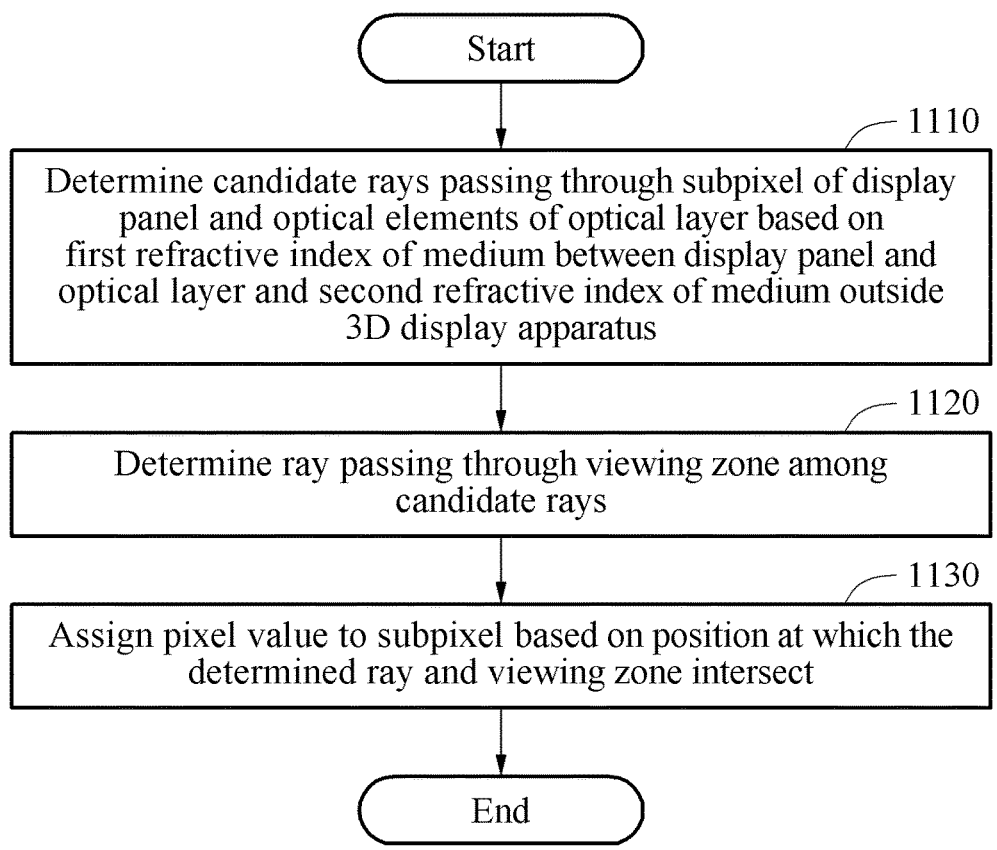

THREE-DIMENSIONAL (3D) IMAGE RENDERING METHOD AND APPARATUS

CROSS-REFERENCE TO RELATED APPLICATION

This application claims priority from Korean Patent Application No. 10-2016-0155647, filed on Nov. 22, 2016, in the Korean Intellectual Property Office, the disclosure of which is incorporated herein by reference in its entirety.

BACKGROUND

1. Field

Methods and apparatuses consistent with exemplary embodiments relate to a three-dimensional (3D) image rendering method and apparatus.

2. Description of the Related Art

The most dominant factor for recognizing a three-dimensional (3D) image is a difference between respective images shown to a left eye and a right eye of a user. A scheme of displaying different images to the two eyes of a user may include, for example, a glasses scheme and a glasses-free scheme. In the glasses scheme, filtering of a desired image may be performed by using polarized light division, time division or wavelength division for differentiating a wavelength of a primary color. In the glasses-free scheme, each image may be caused to be visible in a predetermined space by using a 3D conversion apparatus, such as, for example, a parallax barrier, a lenticular lens or a directional backlight unit (BLU). The glasses-free scheme may reduce an inconvenience of wearing glasses. However, when an exact refractive index is not reflected to assignment of a viewpoint when rays representing a 3D image are refracted based on a medium in a 3D display apparatus, an image quality may be degraded due to crosstalk.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a three-dimensional (3D) image rendering method including determining candidate rays that propagate through a pixel of a display panel and candidate view fields included in a viewing zone based on a first refractive index of a first medium that is disposed between the display panel and an optical layer in a 3D display apparatus and a second refractive index of a second medium that is disposed outside the 3D display apparatus, determining intersection points between the candidate rays and the optical layer, and assigning a pixel value to the pixel based on respective distances between the intersection points and optical elements of the optical layer.

The determining of the intersection points may include determining the intersection points based on a respective angle of incidence and a respective angle of refraction of each of the candidate rays based on the first refractive index and the second refractive index. The determining of the intersection points may include calculating a respective distance between the pixel and each of the candidate view fields on a two-dimensional (2D) plane based on positions of the candidate view fields and a position of the pixel, calculating a respective distance between the pixel and each of the intersection points on the 2D plane based on the first refractive index and the second refractive index, and determining respective positions of the intersection points based on the calculated respective distances between the pixel and the candidate view fields and the calculated respective distances between the pixel and the intersection points.

The candidate view fields may correspond to a left viewpoint and a right viewpoint for a single user, or may correspond to a preset number of viewpoints for multiple views. The assigning of the pixel value may include assigning, to the pixel, a pixel value of a viewpoint that corresponds to a nearest intersection point to an optical element from among the intersection points.

When the candidate view fields correspond to a left viewpoint and a right viewpoint for a single user, the candidate rays may include a first ray emitted to the left viewpoint and a second ray emitted to the right viewpoint. The assigning of the pixel value may include assigning, to the pixel, a pixel value that corresponds to the left viewpoint or a pixel value corresponding to the right viewpoint based on a distance between an optical element and an intersection point between the first ray and the optical layer and a distance between the optical element and an intersection point between the second ray and the optical layer. When the candidate view fields correspond to a preset number of viewpoints for multiple views, the candidate rays may include respective rays emitted to each of the viewpoints. The assigning of the pixel value may include assigning, to the pixel, a pixel value that corresponds to one of the viewpoints based on a respective distance between an optical element and an intersection point between each of the rays and the optical layer.

According to another aspect of an exemplary embodiment, there is provided a 3D image rendering method including determining candidate rays that propagate through a pixel of a display panel and optical elements of an optical layer based on a first refractive index of a first medium that is disposed between the display panel and the optical layer in a 3D display apparatus and a second refractive index of a second medium that is disposed outside the 3D display apparatus, determining a ray that propagates through a viewing zone from among the candidate rays, and assigning a pixel value to the pixel based on a position at which the determined ray and the viewing zone intersect.

The determining of the ray may include, when at least two rays propagate through the viewing zone, selecting a ray that is nearest to a center of the viewing zone from among the at least two rays. The assigning of the pixel value may include, when no ray propagates through the viewing zone, assigning, to the pixel, a lowest pixel value in a predetermined range or a pixel value of a viewpoint that corresponds to a nearest candidate view field to the candidate rays from among candidate view fields included in the viewing zone.

The viewing zone may include candidate view fields. The candidate view fields may correspond to a left viewpoint and a right viewpoint for a single user, or may correspond to a preset number of viewpoints for multiple views. The assigning of the pixel value may include determining a nearest candidate view field to the position at which the determined ray and the viewing zone intersect, and assigning, to the pixel, a pixel value of a viewpoint that corresponds to the determined candidate view field.

According to another aspect of an exemplary embodiment, there is provided a 3D image rendering method including receiving an eye position of a user, determining a candidate ray that propagates through a pixel of a display panel and the eye position based on a first refractive index of a first medium that is disposed between the display panel and an optical layer in a 3D display apparatus and a second refractive index of a second medium that is disposed outside the 3D display apparatus, determining an intersection point between the candidate ray and the optical layer, and assigning a pixel value to the pixel based on a respective distance between the intersection point and each of optical elements adjacent to the intersection point in the optical layer.

According to another aspect of an exemplary embodiment, there is provided a 3D image rendering apparatus including a processor, and a memory including at least one instruction that is readable by a computer. When the at least one instruction is executed by the processor, the processor may be configured to determine candidate rays that propagate through a pixel of a display panel and candidate view fields included in a viewing zone based on a first refractive index of a first medium that is disposed between the display panel and an optical layer in a 3D display apparatus and a second refractive index of a second medium that is disposed outside the 3D display apparatus, configured to determine respective intersection points between the candidate rays and the optical layer, and configured to assign a pixel value to the pixel based on respective distances between the intersection points and optical elements of the optical layer.

The processor may be further configured to determine the intersection points based on a respective angle of incidence and a respective angle of refraction of each of the candidate rays based on the first refractive index and the second refractive index. The processor may be further configured to calculate a respective distance between the pixel and each of the candidate view fields on a 2D plane based on positions of the candidate view fields and a position of the pixel, configured to calculate a respective distance between the pixel and each of the intersection points on the 2D plane based on the first refractive index and the second refractive index, and configured to determine positions of the intersection points based on the calculated respective distances between the pixel and the candidate view fields and the calculated respective distances between the pixel and the intersection points.

The candidate view fields may correspond to a left viewpoint and a right viewpoint for a single user, or may correspond to a preset number of viewpoints for multiple views. The processor may be further configured to assign, to the pixel, a pixel value of a viewpoint that corresponds to a nearest intersection point to an optical element from among the intersection points.

When the candidate view fields correspond to a left viewpoint and a right viewpoint for a single user, the candidate rays may include a first ray emitted to the left viewpoint and a second ray emitted to the right viewpoint. The processor may be further configured to assign, to the pixel, a pixel value that corresponds to the left viewpoint or a pixel value that corresponds to the right viewpoint based on a distance between an optical element and an intersection point between the first ray and the optical layer and a distance between the optical element and an intersection point between the second ray and the optical layer. When the candidate view fields correspond to a preset number of viewpoints for multiple views, the candidate rays may include respective rays emitted to each of the viewpoints. The processor may be further configured to assign, to the pixel, a pixel value that corresponds to one of the viewpoints based on a distance between an optical element and an intersection point between each of the rays and the optical layer.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which:

FIG. 11 is a flowchart illustrating another example of a 3D image rendering method, according to an exemplary embodiment.

DETAILED DESCRIPTION

Figure 1:
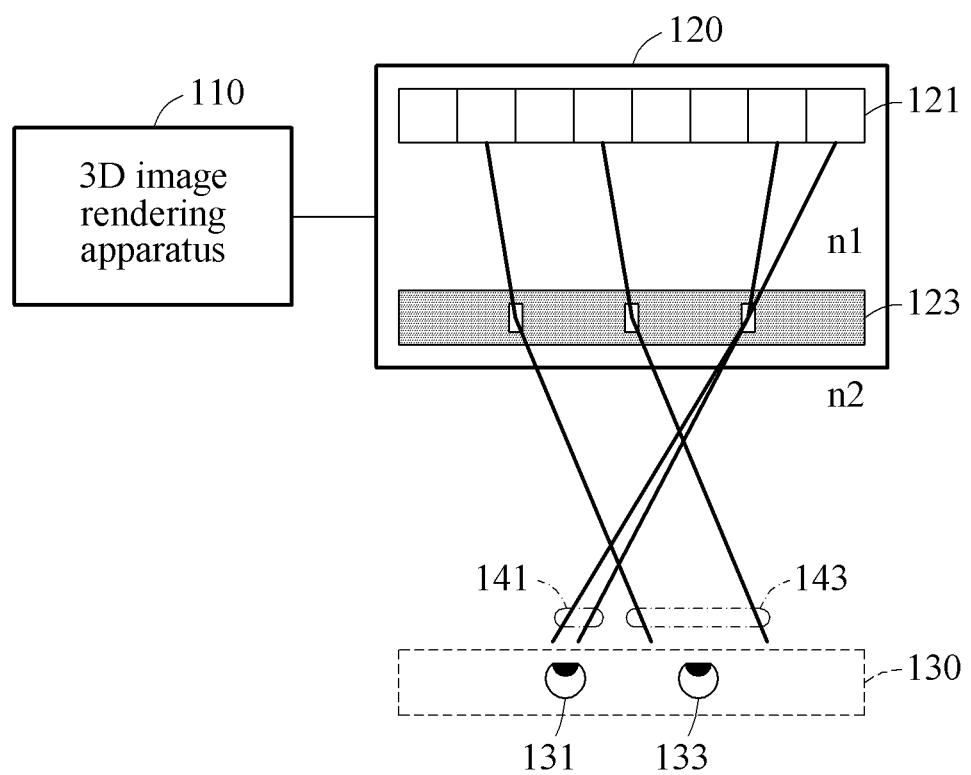
FIG. 1 is a diagram illustrating a three-dimensional (3D) image rendering system, according to an exemplary embodiment.

The following structural or functional descriptions are exemplary to merely describe the exemplary embodiments, and the scope of the exemplary embodiments is not limited to the descriptions provided in the present specification. Various changes and modifications can be made thereto by persons having ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right, according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by a person having ordinary skill in the art. Terms defined in dictionaries generally used should be construed to have meanings matching with contextual meanings in the related art, and are not to be construed as an ideal or excessively formal meaning unless otherwise defined herein.

Hereinafter, exemplary embodiments will be described in detail with reference to the accompanying drawings, and like reference numerals in the drawings refer to like elements throughout.

FIG. 1 is a diagram illustrating a three-dimensional (3D) image rendering system, according to an exemplary embodiment. Referring to FIG. 1, the 3D image rendering system includes a 3D image rendering apparatus 110, a 3D display apparatus 120 and a viewing zone 130.

The 3D display apparatus 120 includes a display panel 121 and an optical layer 123. The 3D image rendering apparatus 110 may assign pixel values to pixels of the display panel 121, and the display panel 121 may display a panel image based on the assigned pixel values. In the following description, the pixels of the display panel 121 may be referred to as "subpixels." The optical layer 123 may include, for example, a parallax barrier, a lenticular lens, and/or a directional backlight unit (BLU). For convenience of description, a parallax barrier will be described as an example of the optical layer 123 in FIG. 1, however, there is no limitation thereto. Accordingly, the optical layer 123 may be a lenticular lens or a directional BLU. For example, when the optical layer 123 is a directional BLU, the display panel 121 may be located in front of the optical layer 123, unlike the configuration illustrated in FIG. 1.

Light emitted by a light source may be provided to the subpixels of the display panel 121. The light source may include, for example, a BLU located behind the display panel 121 or a directional BLU that is an example of the optical layer 123. For example, when light is provided to the subpixels, light that corresponds to pixel values of the subpixels may be visible to a user. In this example, the optical layer 123 may limit a direction in which the light is visible to the user. For example, a parallax barrier may output light in a limited direction through slits arranged at regular intervals, and a lenticular lens may output light in a limited direction via a curve of the lenticular lens. Also, a directional BLU may provide light in a limited direction to the display panel 121. In the following description, elements, for example, the slits of the parallax barrier or the curve of the lenticular lens, which are configured to allow light to pass in the limited direction, may be referred to as "optical elements." Also, light output by the 3D display apparatus 120 may be referred to as a "ray." For example, rays 141 and 143 may be output by a portion of the subpixels of the display panel 121 and a portion of optical elements of the optical layer 123.

The 3D image rendering apparatus 110 may predict directions of the rays 141 and 143 and may assign appropriate pixel values to subpixels of the display panel 121 based on the directions of the rays 141 and 143. For example, the 3D image rendering apparatus 110 may predict the directions of the rays 141 and 143 based on a refractive index n1 of a first medium that is disposed between the display panel 121 and the optical layer 123 and a refractive index n2 of a second medium that is disposed outside the 3D display apparatus 120. The first medium, which is disposed between the display panel 121 and the optical layer 123, may be used to attach the display panel 121 to the optical layer 123.

In an example, the refractive index n1 may be similar to a refractive index of the display panel 121 and/or a refractive index of the optical layer 123. Also, a thickness of the display panel 121 and/or a thickness of the optical layer 123 may be significantly less than a distance between the display panel 121 and the optical layer 123. Accordingly, in association with refraction of light, the refractive index of the display panel 121 and/or the refractive index of the optical layer 123 may be ignored.

In another example, the refractive index n1 may be a representative value of refractive indices based on both the refractive index of the display panel 121 and the refractive index of the optical layer 123.

Based on a Snell's law, when light propagates through a boundary between respective media which have different refractive indices, a sine value of an angle of incidence and a sine value of an angle of reflection may be determined based on the refractive indices of the media. Generally, a direction of a ray may be predicted based on an approximate value based on refractive indices of media and a thickness of a parallax barrier or a lenticular lens. However, because the approximate value is based on an operation that a ratio of tangent values instead of a ratio of sine values is inversely proportional to a ratio of refractive indices, an error may occur when it is inaccurate to approximate a sine value to a tangent value.

In an example, when a normal direction and a direction in which light is refracted are slightly different from each other, a relatively small error due to the approximated value may occur. In another example, when the normal direction and the direction in which light is refracted are greatly different from each other, an artifact may be observed in a 3D image due to an increase in a difference between the approximated value and a direction in which light is actually refracted. The artifact caused by the approximated value may increase when a size of the 3D display apparatus 120 increases. The 3D image rendering apparatus 110 may individually apply an operation based on a refractive index to all the subpixels of the display panel 121 in order to predict directions of rays output from the subpixels, and accordingly it is possible to prevent an artifact from occurring. The refractive index n1 may be determined based on the first medium that is disposed between the display panel 121 and the optical layer 123. For example, air may be present outside the 3D display apparatus 120, and accordingly the refractive index n2 may be set to "1."

When the directions of the rays 141 and 143 are predicted based on a refractive index, the 3D image rendering apparatus 110 may assign pixel values to subpixels of the display panel 121. To provide a 3D effect to a user, images of different viewpoints may need to be respectively provided to the two eyes of the user. The 3D image rendering apparatus 110 may assign pixel values that correspond to viewpoints of the user to subpixels of the display panel 121 so that images of different viewpoints may be provided to the eyes of the user.

The viewing zone 130 may include candidate view fields. In an example, in FIG. 1, the viewing zone 130 may include a candidate view field that corresponds to a left viewpoint and a candidate view field that corresponds to a right viewpoint. The left viewpoint and the right viewpoint may be provided for a single user. In another example, unlike the configuration illustrated in FIG. 1, the viewing zone 130 may include candidate view fields that correspond to a preset number of viewpoints. In this example, the preset number of viewpoints may be provided for multiple views. In multiple views, a plurality of users as well as a single user may view a 3D image, however, a resolution may decrease when a number of provided viewpoints increases. When the directions of the rays 141 and 143 are predicted, the 3D image rendering apparatus 110 may assign a pixel value based on one of a plurality of viewpoints that correspond to candidate view fields to a subpixel.

The 3D image rendering apparatus 110 may compare actual directions of the rays 141 and 143 and positions of candidate view fields and may directly determine a viewpoint that corresponds to a subpixel, which will be further described below. For example, because the rays 141 are output near a left viewpoint 131 of a user, the 3D image rendering apparatus 110 may assign a pixel value that corresponds to the left viewpoint 131 to subpixels that output the rays 141. Because the rays 143 are output near a right viewpoint 133 of the user, the 3D image rendering apparatus 110 may assign a pixel value that corresponds to the right viewpoint 133 to subpixels that output the rays 143. The directions of the rays 141 and 143 may be determined based on actual refractive indices of respective media, and accordingly may be relatively accurately predicted. Thus, it is possible to minimize an artifact in a 3D image in comparison to when an approximate value is uniformly applied.

Also, the 3D image rendering apparatus 110 may indirectly determine a viewpoint that corresponds to a subpixel based on a respective distance between an optical element and each of virtual rays that are based on eye positions of a user. A method of indirectly determining a viewpoint that corresponds to a subpixel will be further described below with reference to FIGS. 4A and 4B.

Figure 2:
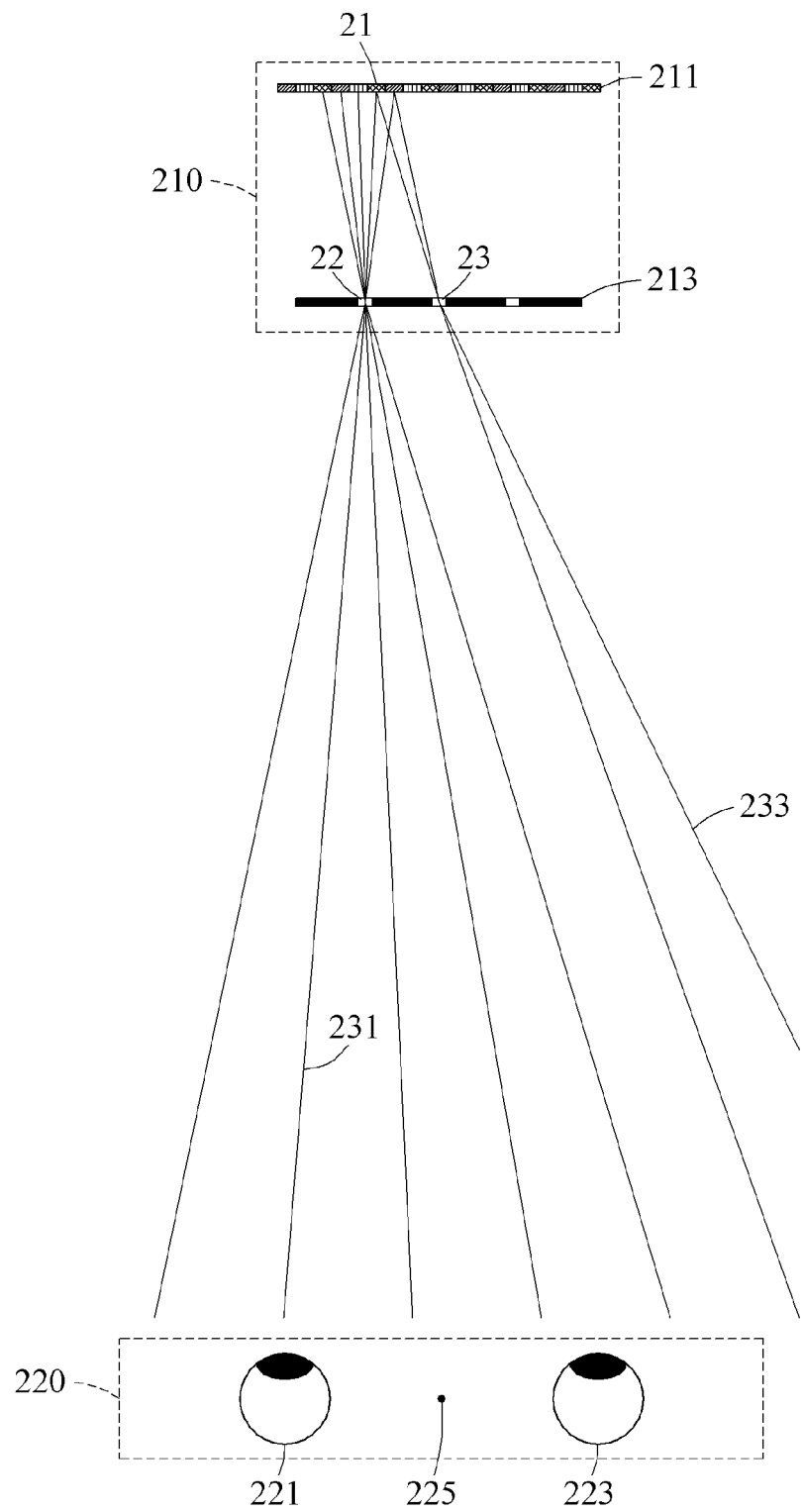
FIG. 2 is a diagram illustrating an example of 3D image rendering for a single user, according to an exemplary embodiment.

FIG. 2 is a diagram illustrating an example of 3D image rendering for a single user, according to an exemplary embodiment. FIG. 2 illustrates a 3D display apparatus 210, a viewing zone 220 and rays.

The 3D display apparatus 210 may include a display panel 211 and an optical layer 213. Because the optical layer 213 is located in front of the display panel 211, the optical layer 213 may correspond to a parallax barrier or a lenticular lens. A 3D image rendering apparatus may determine candidate rays that pass through subpixels of the display panel 211 and optical elements of the optical layer 213, based on an arrangement of the display panel 211 and the optical layer 213. The 3D image rendering apparatus may determine the candidate rays based on, for example, a refractive index n1 of a first medium that is disposed between the display panel 211 and the optical layer 213 and a refractive index n2 of a second medium that is disposed outside the 3D display apparatus 210. For example, the 3D image rendering apparatus may determine a candidate ray 231 that passes through a subpixel 21 and an optical element 22, and a candidate ray 233 that passes through the subpixel 21 and an optical element 23.

The 3D image rendering apparatus may determine a ray that propagates through the viewing zone 220 from among the candidate rays. For example, the 3D image rendering apparatus may select the candidate ray 231 that propagates through the viewing zone 220 from the candidate rays 231 and 233. The 3D image rendering apparatus may assign a pixel value to the subpixel 21 based on a position at which the determined ray and the viewing zone 220 intersect. For example, the 3D image rendering apparatus may determine the closest candidate view field to the position at which the determined ray and the viewing zone 220 intersect, from among candidate view fields included in the viewing zone 220, and may assign a pixel value of a viewpoint that corresponds to the determined candidate view field to a subpixel. For example, the candidate ray 231 and a view field that corresponds to a left viewpoint 221 may intersect, and accordingly the 3D image rendering apparatus may assign a pixel value that corresponds to the left viewpoint 221 to the subpixel 21. When a predetermined candidate ray and a view field that corresponds to a right viewpoint 223 intersect, the 3D image rendering apparatus may assign a pixel value that corresponds to the right viewpoint 223 to a subpixel that corresponds to the candidate ray.

For example, at least two candidate rays from among candidate rays output from a single subpixel may propagate through the viewing zone 220. In this example, the 3D image rendering apparatus may select one of the at least two candidate rays that propagate through the viewing zone 220 based on a predetermined condition.

The 3D image rendering apparatus may select a single ray that is relatively close to a central point 225 of the viewing zone 220 from the at least two candidate rays that propagate through the viewing zone 220. For example, a plurality of candidate rays, for example, candidate rays L1 and L2, that are output from a subpixel P1 and that pass through a plurality of optical elements, for example, optical element O1 and O2, may all propagate through the viewing zone 220, although not shown in the drawings. In this example, the 3D image rendering apparatus may select a single ray that is relatively close to the central point 225 from the candidate rays L1 and L2.

The 3D image rendering apparatus may select a single ray that is relatively close to a central point of a candidate view field from the at least two candidate rays that propagate through the viewing zone 220. For example, when a distance between a view field that corresponds to the left viewpoint 221 and the candidate ray L1 that is output from the subpixel P1 and that passes through the optical element O1 is set to 2 millimeters (mm) and when a distance between a view field that corresponds to the right viewpoint 223 and the candidate ray L2 that is output from the subpixel P1 and that passes through the optical element O2 is set to 3 mm, the 3D image rendering apparatus may select the candidate ray L1.

For example, at least one of candidate rays L3 and L4 output from a subpixel P2 may not propagate through the viewing zone 220, although not shown in the drawings. In this example, the 3D image rendering apparatus may assign a lowest pixel value in a predetermined range to the subpixel P2. Pixel values may range, for example, from "0" to "255." When the candidate rays L3 and L4 do not propagate through the viewing zone 220, the 3D image rendering apparatus may assign a pixel value of "0" to the subpixel P2.

Also, the 3D image rendering apparatus may assign, to the subpixel P2, a pixel value of a viewpoint that corresponds to the nearest candidate view field to the candidate rays L3 and L4 from among the candidate view fields included in the viewing zone 220. For example, when a distance between the candidate ray L3 and the view field that corresponds to the left viewpoint 221 is set to 5 mm and when a distance between the candidate ray L4 and the view field that corresponds to the right viewpoint 223 is set to 7 mm, even when the candidate rays L3 and L4 do not propagate through the viewing zone 220, the 3D image rendering apparatus may assign a pixel value of the left viewpoint 221 to the subpixel P2.

Figure 3:
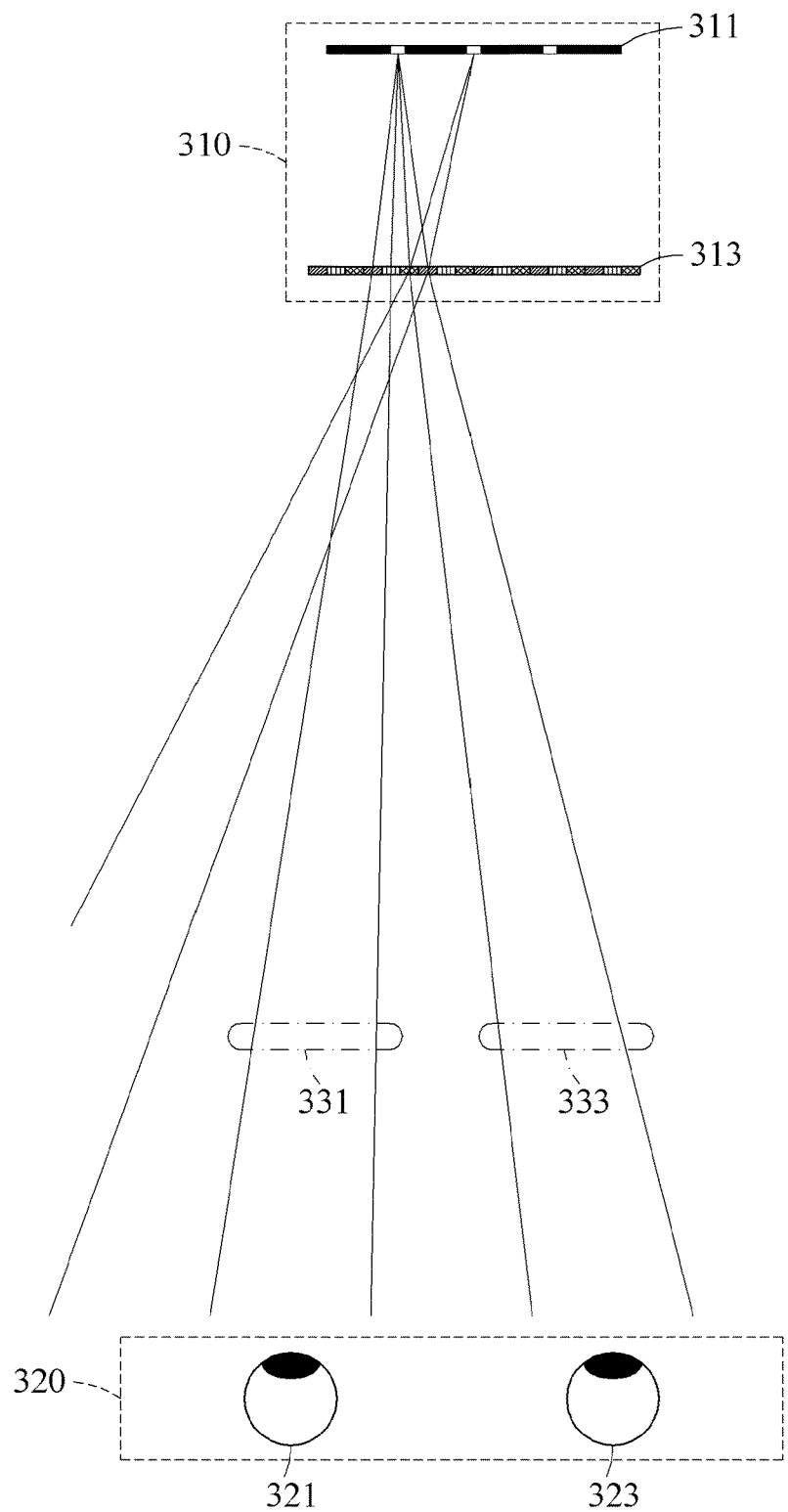
FIG. 3 is a diagram illustrating another example of 3D image rendering for a single user, according to an exemplary embodiment.

FIG. 3 is a diagram illustrating another example of 3D image rendering for a single user, according to an exemplary embodiment. FIG. 3 illustrates a 3D display apparatus 310, a viewing zone 320 and rays.

The 3D display apparatus 310 may include an optical layer 311 and a display panel 313. Because the optical layer 311 is located behind the display panel 313, the optical layer 311 may correspond to a directional BLU. A 3D image rendering apparatus may determine candidate rays that pass through optical elements of the optical layer 311 and subpixels of the display panel 313, based on an arrangement of the optical layer 311 and the display panel 313.

The 3D image rendering apparatus may determine a ray that propagates through the viewing zone 320 from among the candidate rays based on a refractive index n1 of a first medium that is disposed between the optical layer 311 and the display panel 313 and a refractive index n2 of a second medium that is disposed outside the 3D display apparatus 310. Also, the 3D image rendering apparatus may assign a pixel value to a subpixel based on a position at which the determined ray and the viewing zone 320 intersect. For example, the 3D image rendering apparatus may assign a pixel value that corresponds to a left viewpoint 321 to subpixels that output candidate rays 331 and may assign a pixel value that corresponds to a right viewpoint 323 to subpixels that output candidate rays 333.

As described above with reference to FIG. 2, at least two candidate rays from among candidate rays output from a single subpixel may propagate through the viewing zone 320, or a portion of candidate rays output from another subpixel may not propagate through the viewing zone 320. In this example, the 3D image rendering apparatus may assign pixel values to subpixels based on a predetermined rule.

Figure 4A:
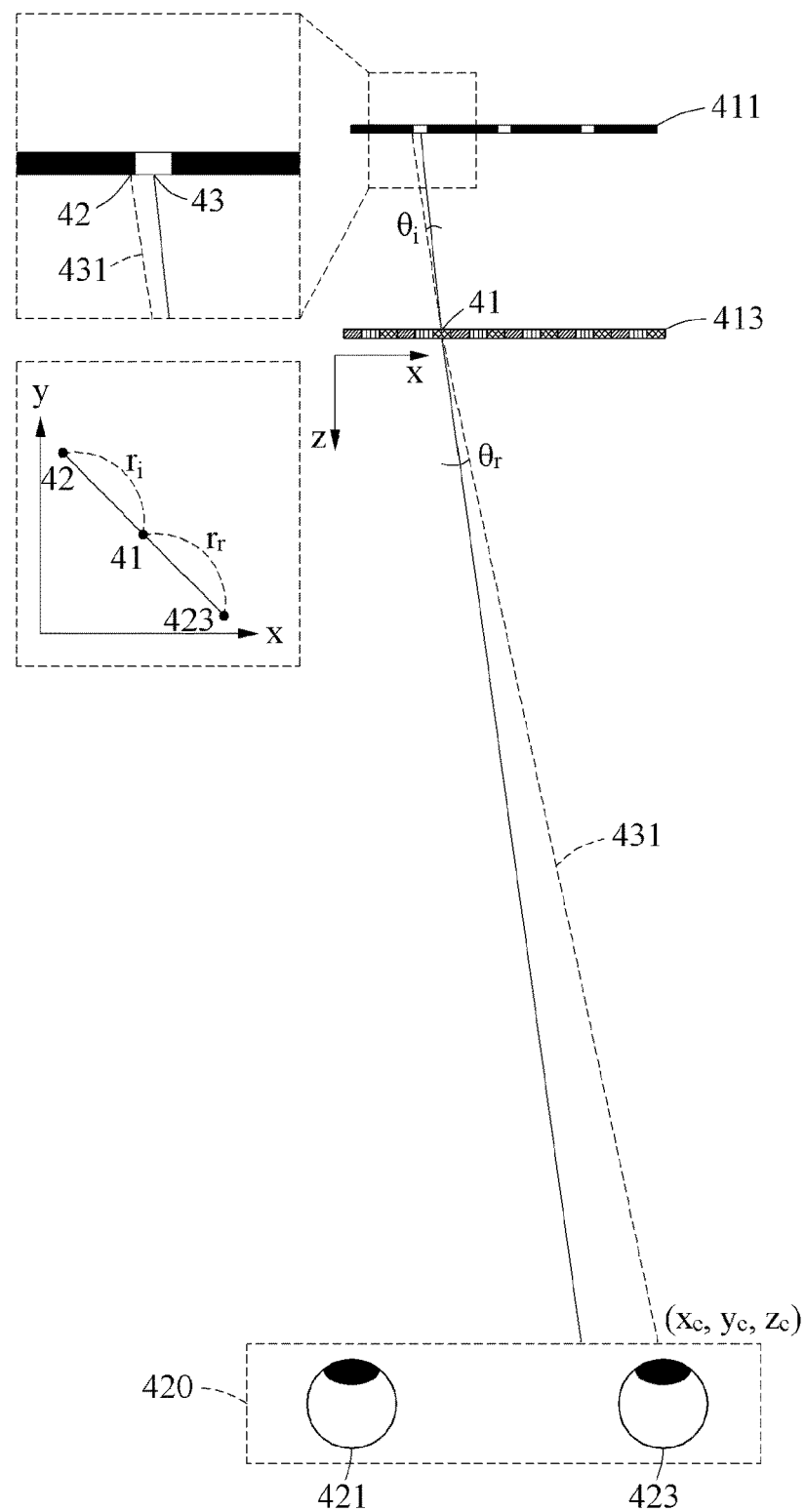
FIGS. 4A and 4B are diagrams illustrating a method of indirectly determining a pixel value for a single user, according to an exemplary embodiment.
Figure 4B:
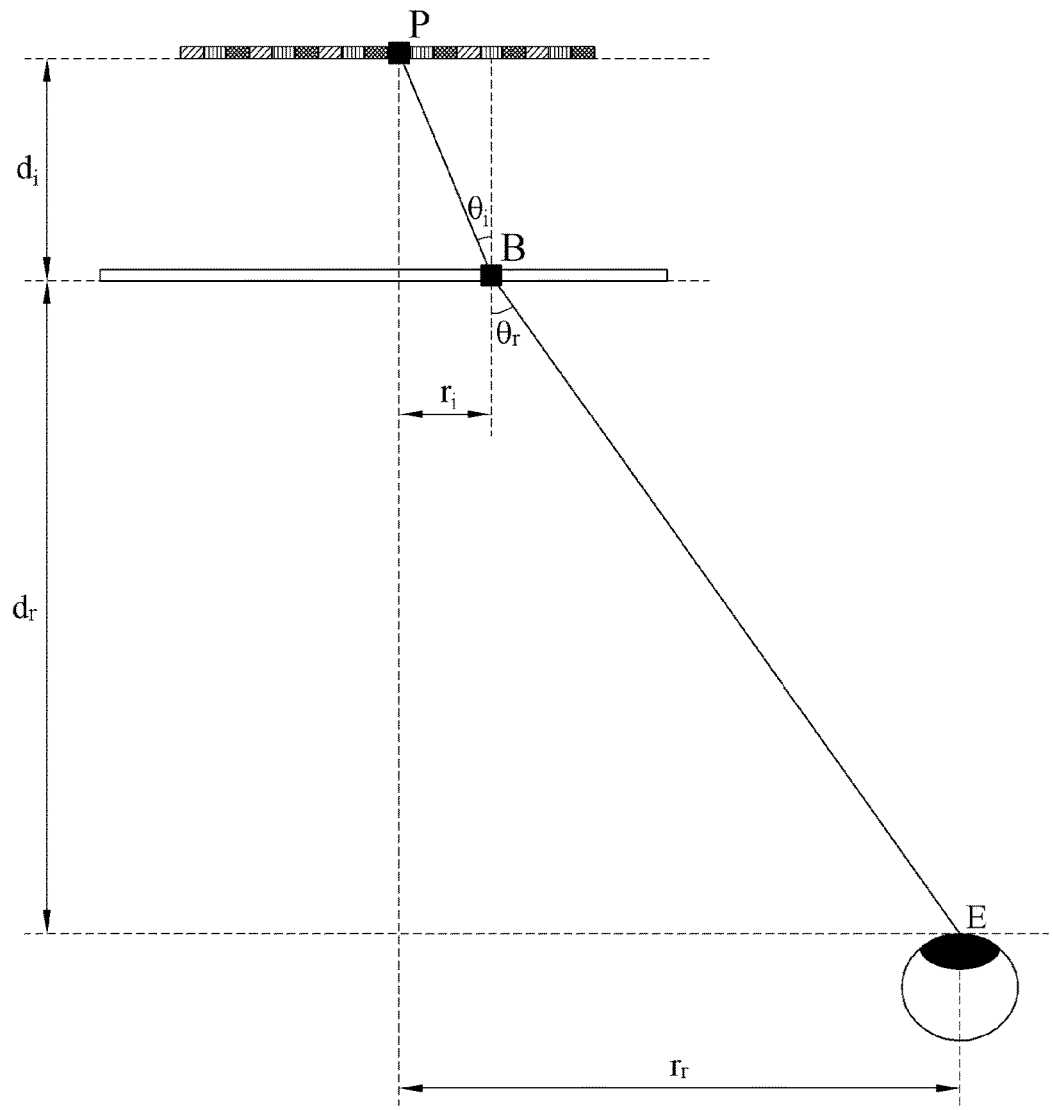

FIGS. 4A and 4B are diagrams illustrating a method of indirectly determining a pixel value for a single user, according to an exemplary embodiment. FIG. 4A illustrates an optical layer 411, a display panel 413, a viewing zone 420 and rays.

As described above, a 3D image rendering apparatus may indirectly determine a viewpoint that corresponds to a subpixel based on a distance between an optical element and virtual candidate rays that are based on eye positions of a user. A ray that passes through a subpixel may actually pass through a central portion of an optical element in the optical layer 411, however, the 3D image rendering apparatus may use a virtual candidate ray that passes through a predetermined subpixel and a predetermined candidate view field.

The 3D image rendering apparatus may determine an intersection point at which a virtual candidate ray intersects the optical layer 411. The 3D image rendering apparatus may relatively determine a candidate view field that is relatively near to the virtual candidate ray based on a distance between the intersection point and a central point of the nearest optical element to the intersection point.

For example, the 3D image rendering apparatus may determine a first intersection point based on a left viewpoint 421 and may determine a second intersection point based on a right viewpoint 423. In this example, the 3D image rendering apparatus may determine candidate rays based on a refractive index n1 of a first medium that is disposed between the display panel 413 and the optical layer 411 and a refractive index n2 of a second medium that is disposed outside a 3D display apparatus. The 3D image rendering apparatus may determine a viewpoint that corresponds to an intersection point that is relatively close to a central point of a neighboring optical element that is located between the first intersection point and the second intersection point as a viewpoint that needs to be represented by a subpixel.

The 3D image rendering apparatus may acquire a position of the left viewpoint 421 and a position of the right viewpoint 423 based on a viewpoint tracking scheme by using a separate camera. The 3D image rendering apparatus may determine a first candidate ray 431 that passes through a subpixel 41 and a right viewpoint 423, and may determine an intersection point 42 at which the first candidate ray 431 and the optical layer 411 intersect based on refraction. The position of the right viewpoint 423 may be represented by the coordinates $(x_e, y_e, z_e)$ and a position of the subpixel 41 may be represented by the coordinates $(x_p, y_p, z_p)$.

A distance $r_r$ between a point onto which the right viewpoint 423 is projected and a point onto which the subpixel 41 is projected in a two-dimensional (2D) plane, for example, an x-y plane, may be represented as shown in Equation 1 below.

$$r_r = \sqrt{(x_e - x_p)^2 + (y_e - y_p)^2} \qquad \text{[Equation 1]}$$

Also, based on the Snell's law, an angle $\theta_r$ of refraction and an angle $\theta_i$ of incidence may be represented by Equations 2 and 3 below.

$$\theta_r = \tan^{-1} \frac{r_r}{z_e - z_p} \qquad \text{[Equation 2]}$$

$$\theta_i = \sin^{-1}\left(\frac{n_r}{n_i}\sin\theta_r\right) \qquad \text{[Equation 3]}$$

When the intersection point 42 is represented by coordinates $(x_b, y_b, z_b)$, a distance $r_i$ between a point onto which the intersection point 42 is projected and the point onto which the subpixel 41 is projected in the x-y plane, may be represented as shown in Equation 4 below.

$$r_i = (z_p - z_b)\tan\theta_i \qquad \text{[Equation 4]}$$

A straight line may be formed by the point onto which the right viewpoint 423 is projected, the point onto which the subpixel 41 is projected and the point onto which the intersection point 42 is projected in the x-y plane, and accordingly an x-coordinate and y-coordinate of the intersection point 42 may be obtained by applying Equations 5 and 6 shown below.

$$x_b = x_p - \frac{r_i}{r_r}(x_e - x_p) \qquad \text{[Equation 5]}$$

$$y_b = y_p - \frac{r_i}{r_r}(y_e - y_p) \qquad \text{[Equation 6]}$$

The x-coordinate and y-coordinate of the intersection point 42 may be represented by four fundamental arithmetic operations and a square root based on a formula of a trigonometric function. Accordingly, a load of an operation may be greatly reduced by applying Equations 7, 8, 9 and 10 shown below.

$$\tan\theta_r = t_r = \frac{r_r}{z_e - z_p} \qquad \text{[Equation 7]}$$

$$\sin\theta_r = s_r = \frac{t_r}{\sqrt{1 + t_r^2}} \qquad \text{[Equation 8]}$$

$$\sin\theta_i = s_i = \frac{n_r}{n_i}s_r \qquad \text{[Equation 9]}$$

-continued $$\tan\theta_i = t_i = \frac{s_i}{\sqrt{1-s_i^2}}$$ [Equation 10]

Accordingly, a distance $r_i$ between the subpixel 41 and the intersection point 42 in the x-y plane may be represented as shown in Equation 11 below.

$$r_i = (z_p - z_b)t_i$$ [Equation 11]

Because a position of a virtual ray on an optical layer from a subpixel towards a viewpoint needs to be calculated when an actual refractive index is used, an amount of calculation may increase in comparison to that which is required when the above-described approximate value is used. However, a real-time performance may not be important for implementation of multiple views, and accordingly an operation time may not be a problem. Also, an amount of calculation may increase by a factor of two instead of n times when eyes for a single user are tracked, and accordingly it is possible to realistically implement multiple views via parallelization of processing of subpixels. In addition, an operation of a trigonometric function may be converted to four fundamental arithmetic operations and a square root based on the above-described equations, and thus it is possible to greatly reduce a load of an operation by using a refractive index.

A z-coordinate of the intersection point 42 may be obtained based on a distance between the optical layer 411 and the display panel 413. Also, coordinates of an optical element 43 may be obtained based on a design value of the optical layer 411. The optical element 43 may be determined as the nearest optical element to the intersection point 42 from among optical elements in the optical layer 411. Accordingly, a distance D1 between the intersection point 42 and the optical element 43 may be obtained based on the coordinates of the intersection point 42 and the coordinates of the optical element 43.

Although not shown in the drawings for convenience of description, when the distance D1 is calculated, the 3D image rendering apparatus may determine a candidate ray L5 that passes through the subpixel 41 and the left viewpoint 421, and may determine an intersection point B2 between the candidate ray L5 and the optical layer 411. Also, the 3D image rendering apparatus may obtain a distance D2 between the intersection point B2 and the nearest optical element O3 to the intersection point B2, based on a similar scheme to that described above. The optical element O3 and the optical element 43 may represent the same target or different targets.

The 3D image rendering apparatus may compare the distances D1 and D2 and may assign a pixel value to the subpixel 41 based on a result of the comparison. In an example, when the distance D1 is less than the distance D2, the 3D image rendering apparatus may assign a pixel value of the right viewpoint 423 to the subpixel 41. In another example, when the distance D1 is greater than the distance D2, the 3D image rendering apparatus may assign a pixel value of the left viewpoint 421 to the subpixel 41.

Based on the above-described scheme, the 3D image rendering apparatus may assign pixel values to all subpixels in the display panel 413.

The optical layer 411 has been described as an example of a directional BLU in FIG. 4A, however, there is no limitation thereto. For example, when the optical layer 411 is a parallax barrier or a lenticular lens, a pixel value for a single user may be indirectly determined.

FIG. 4B illustrates an intersection point B, a pixel P and a right viewpoint E of a user on an r-z plane. An r-axis may be defined as an axis that corresponds to a straight line obtained by projecting a straight line that connects the right viewpoint E and the pixel P onto an x-y plane.

As described above, the 3D image rendering apparatus may determine a virtual ray that passes through the pixel P and an optical layer based on the right viewpoint E, and may determine the intersection point B between the virtual ray and the optical layer. A position of the right viewpoint E may be represented by the coordinates $(x_e, y_e, z_e)$ and a position of the pixel P may be represented by the coordinates $(x_p, y_p, z_p)$. A distance $r_r$ between the right viewpoint E and the pixel P on the r-axis may be represented as shown in Equation 1 above. Also, Equation 3 may be established based on the Snell's law, and Equation 12 may be obtained based on Equation 3 as shown below.

$$\frac{n_i r_i}{\sqrt{d_i^2 + r_i^2}} = \frac{n_r(r_r - r_i)}{\sqrt{d_r^2 + (r_r - r_i)^2}}$$ [Equation 12]

In Equation 12, $r_i$ denotes a distance between the pixel P and the intersection point B in the r-axis, $d_i$ denotes a distance between the pixel P and the intersection point B in a z-axis direction, and $d_r$ denotes a distance between the right viewpoint E and the intersection point B in the z-axis direction.

By solving Equation 12, four solutions of the distance $r_i$ may be obtained. The 3D image rendering apparatus may determine a smallest positive solution from among the four solutions as a final solution. Also, a straight line may be formed by a point onto which the right viewpoint E is projected, a point onto which the pixel P is projected and a point onto which the intersection point B is projected in the x-y plane, and accordingly an x-coordinate and y-coordinate of the intersection point B may be obtained by applying Equations 13 and 14 shown below.

$$x_b - x_p = \frac{r_i}{r_r}(x_e - x_p)$$ [Equation 13]

$$y_b - y_p = \frac{r_i}{r_r}(y_e - y_p)$$ [Equation 14]

The 3D image rendering apparatus may obtain the x-coordinate and y-coordinate of the intersection point B by substituting the distance $r_r$ obtained by applying Equation 1, the final solution of the distance $r_i$ obtained by applying Equation 12, coordinates of the right viewpoint E, and coordinates of the pixel P into Equations 13 and 14. A z-coordinate of the intersection point B may be obtained based on a z-coordinate of the pixel P and a distance between a display panel and an optical layer.

The 3D image rendering apparatus may acquire a distance D1 between the intersection point B and the nearest optical element to the intersection point B. Also, the 3D image rendering apparatus may acquire a distance D2 for a left viewpoint of a user based on the same scheme. The 3D image rendering apparatus may compare the distances D1 and D2 and may assign a pixel value to the pixel P based on a result of the comparison.

Figure 5:
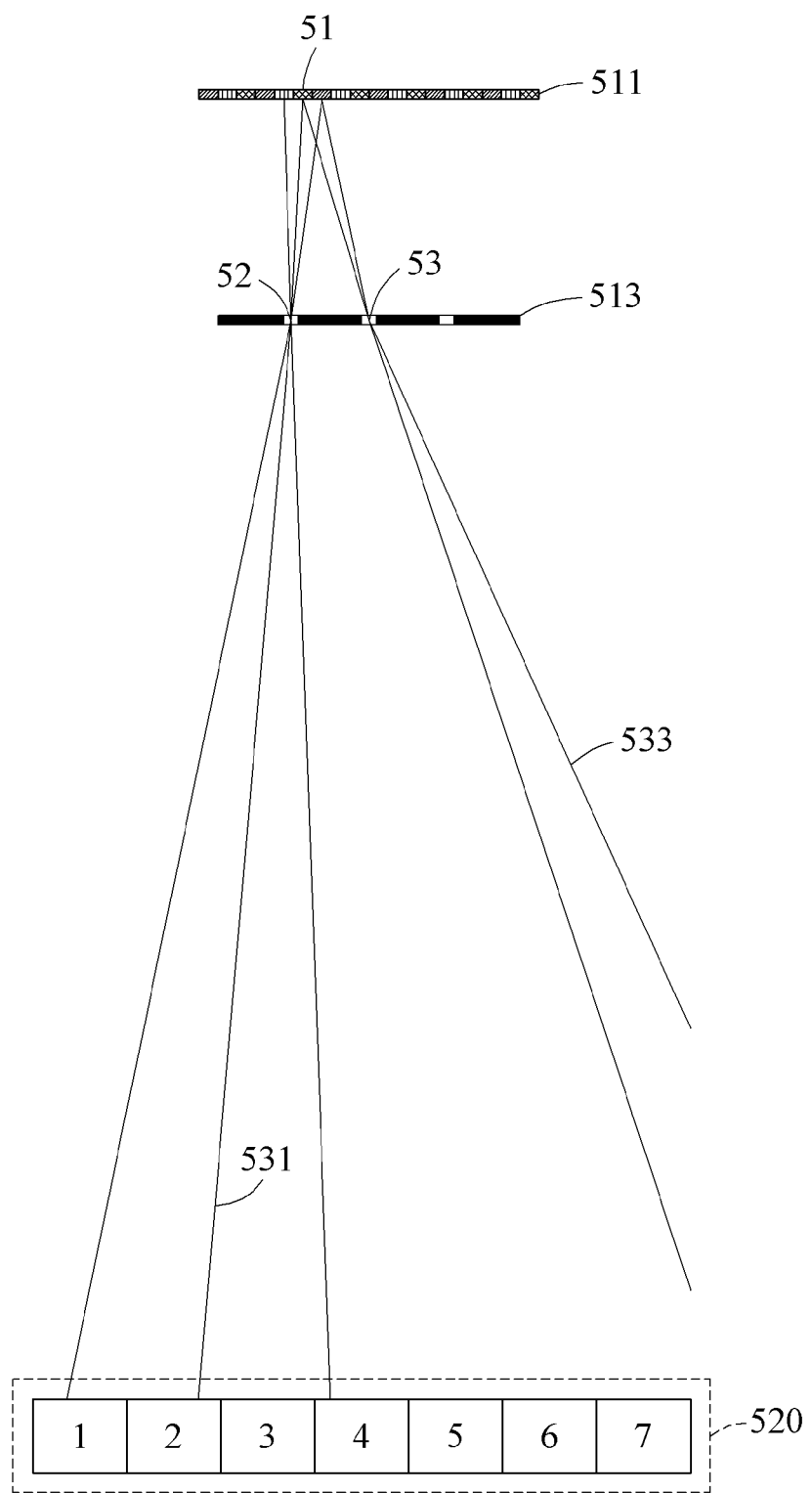
FIG. 5 is a diagram illustrating an example of 3D image rendering for multiple views, according to an exemplary embodiment.

FIG. 5 is a diagram illustrating an example of 3D image rendering for multiple views, according to an exemplary embodiment. FIG. 5 illustrates a display panel 511, an optical layer 513, a viewing zone 520 and rays.

Because the optical layer 513 is located in front of the display panel 511, the optical layer 513 may correspond to a parallax barrier or a lenticular lens. A 3D image rendering apparatus may determine candidate rays that pass through subpixels of the display panel 511 and optical elements of the optical layer 513, based on an arrangement of the display panel 511 and the optical layer 513. The 3D image rendering apparatus may determine the candidate rays based on, for example, a refractive index n1 of a first medium that is disposed between the display panel 511 and the optical layer 513 and a refractive index n2 of a second medium that is disposed outside a 3D display apparatus. For example, the 3D image rendering apparatus may determine a candidate ray 531 that passes through a subpixel 51 and an optical element 52, and a candidate ray 533 that passes through the subpixel 51 and an optical element 53.

The 3D image rendering apparatus may determine a ray that propagates through the viewing zone 520 from among the candidate rays. For example, the 3D image rendering apparatus may select the candidate ray 531 that propagates through the viewing zone 520 from the candidate rays 531 and 533. The 3D image rendering apparatus may assign a pixel value to the subpixel 51 based on a position at which the determined ray and the viewing zone 520 intersect. For example, the 3D image rendering apparatus may determine the nearest candidate view field to the position at which the determined ray and the viewing zone 520 intersect, from among candidate view fields included in the viewing zone 520, and may assign a pixel value of a viewpoint that corresponds to the determined candidate view field to a subpixel. For example, the candidate ray 531 and a view field that corresponds to a second viewpoint may intersect, and accordingly the 3D image rendering apparatus may assign a pixel value that corresponds to the second viewpoint to the subpixel 51.

As described above with reference to FIG. 2, at least two candidate rays from among candidate rays output from a single subpixel may propagate through the viewing zone 520, or a portion of candidate rays output from another subpixel may not propagate through the viewing zone 520. In this example, the 3D image rendering apparatus may assign pixel values to subpixels based on a predetermined rule.

Figure 6:
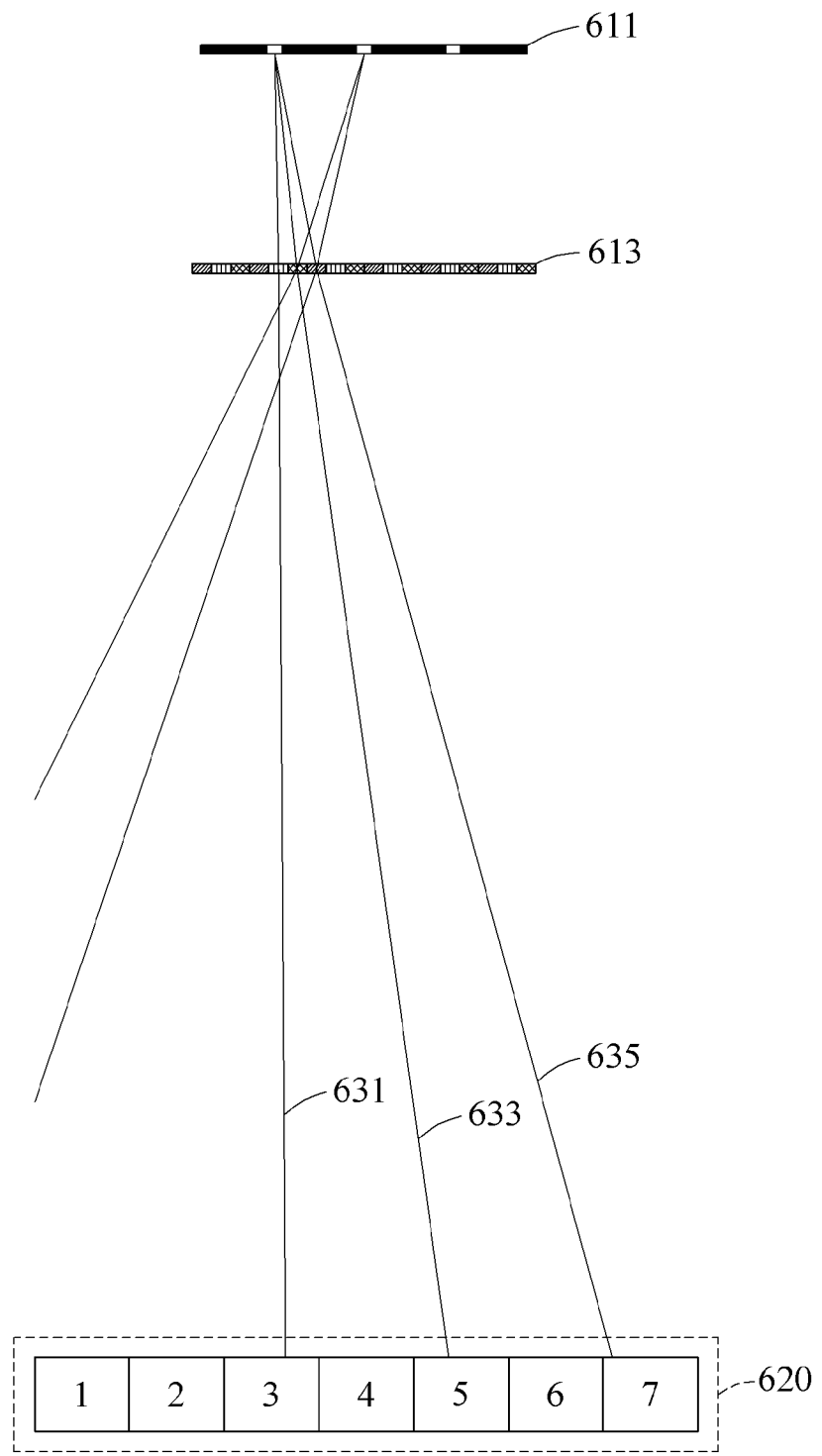
FIG. 6 is a diagram illustrating another example of 3D image rendering for multiple views, according to an exemplary embodiment.

FIG. 6 is a diagram illustrating another example of 3D image rendering for multiple views, according to an exemplary embodiment. FIG. 6 illustrates an optical layer 611, a display panel 613, a viewing zone 620 and rays.

A 3D display apparatus may include the optical layer 611 and the display panel 613. Because the optical layer 611 is located behind the display panel 613, the optical layer 611 may correspond to a directional BLU. A 3D image rendering apparatus may determine candidate rays that pass through optical elements of the optical layer 611 and subpixels of the display panel 613, based on an arrangement of the optical layer 611 and the display panel 613.

The 3D image rendering apparatus may determine a ray that propagates through the viewing zone 620 from among the candidate rays based on a refractive index n1 of a first medium that is disposed between the optical layer 611 and the display panel 613 and a refractive index n2 of a second medium that is disposed outside the 3D display apparatus. Also, the 3D image rendering apparatus may assign a pixel value to a subpixel based on a position at which the determined ray and the viewing zone 620 intersect. For example, the 3D image rendering apparatus may assign a pixel value that corresponds to a third viewpoint to a subpixel that outputs a candidate ray 631, may assign a pixel value that corresponds to a fifth viewpoint to a subpixel that outputs a candidate ray 633, and may assign a pixel value that corresponds to a seventh viewpoint to a subpixel that outputs a candidate ray 635.

As described above with reference to FIG. 2, at least two candidate rays among candidate rays output from a single subpixel may propagate through the viewing zone 620, or a portion of candidate rays output from another subpixel may not propagate through the viewing zone 620. In this example, the 3D image rendering apparatus may assign pixel values to subpixels based on a predetermined rule.

Figure 7:
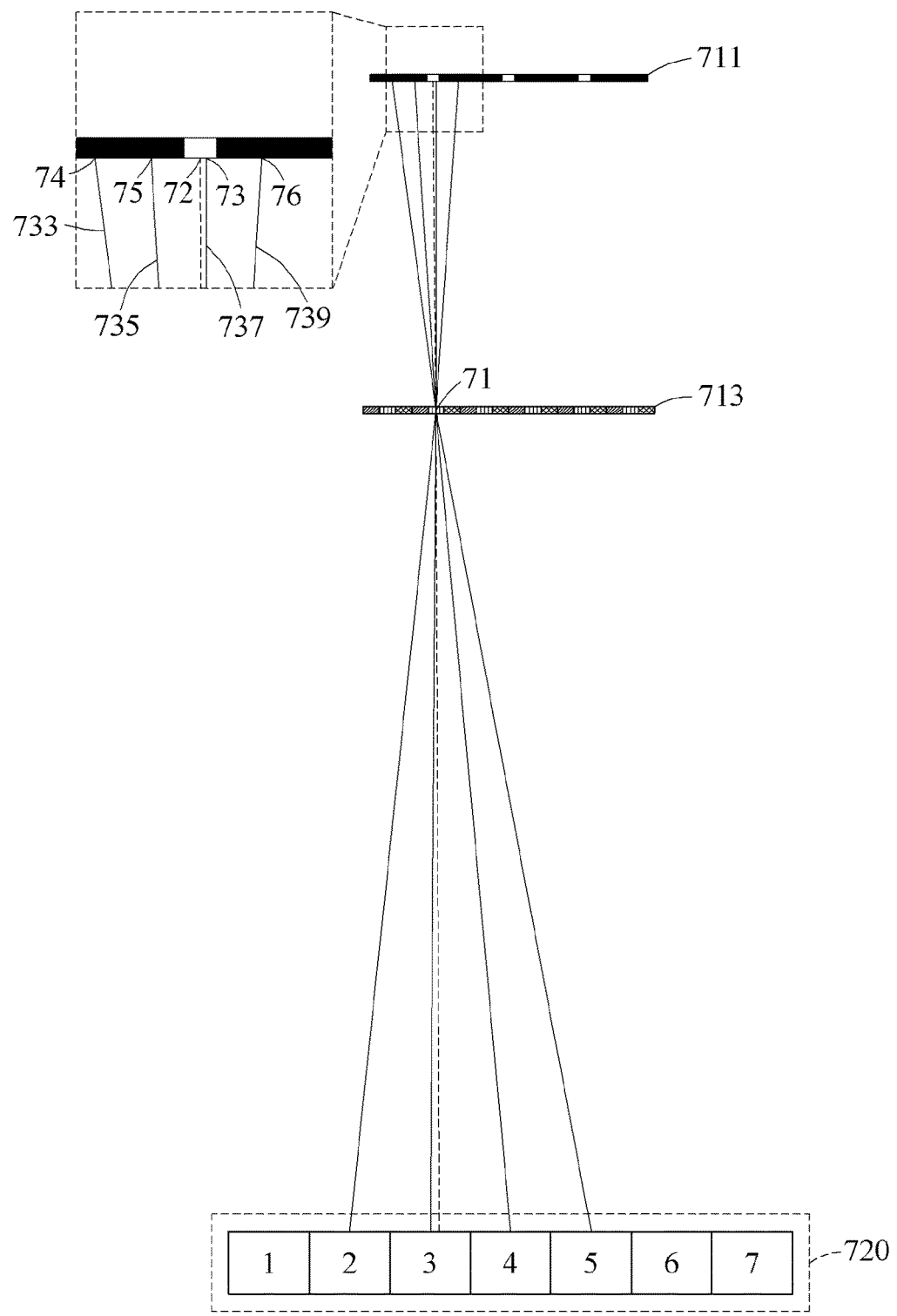
FIG. 7 is a diagram illustrating a method of indirectly determining a pixel value for multiple views, according to an exemplary embodiment.

FIG. 7 is a diagram illustrating a method of indirectly determining a pixel value for multiple views, according to an exemplary embodiment. FIG. 7 illustrates an optical layer 711, a display panel 713, a viewing zone 720 and rays.

As described above, a 3D image rendering apparatus may indirectly determine a viewpoint that corresponds to a subpixel based on a respective distance between an optical element and each of a plurality of candidate rays. For example, the 3D image rendering apparatus may determine candidate rays 733, 735, 737 and 739 that pass through a subpixel 71 of the display panel 713 and candidate view fields included in the viewing zone 720, and may determine intersection points 73, 74, 75 and 76 between each of the candidate rays 733 through 739 and the optical layer 711. The 3D image rendering apparatus may determine the candidate rays 733 through 739 based on a refractive index n1 of a first medium that is disposed between the display panel 713 and the optical layer 711 and a refractive index n2 of a second medium that is disposed outside a 3D display apparatus. Also, the 3D image rendering apparatus may assign a pixel value to the subpixel 71 based on respective distances between the intersection points 73 through 76 and an optical element 72 of the optical layer 711.

In FIG. 7, a distance between the optical element 72 and the intersection point 73 has a minimum value, and accordingly a pixel value corresponding to a third viewpoint may be assigned to the subpixel 71. Based on the above-described scheme, the 3D image rendering apparatus may assign pixel values to all subpixels of the display panel 713. The optical layer 711 has been described as an example of a directional BLU in FIG. 7, however, there is no limitation thereto. Accordingly, the above description may be similarly applicable to a parallax barrier and a lenticular lens.

Figure 8:
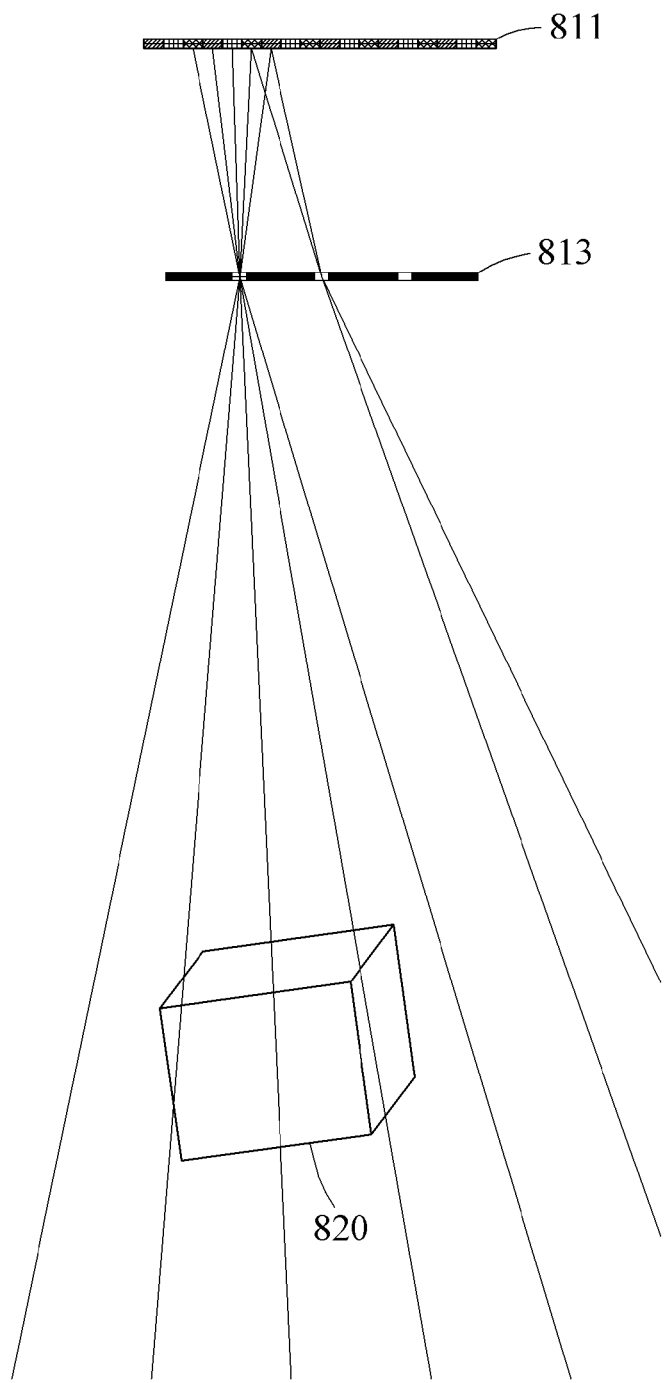
FIG. 8 is a diagram illustrating 3D image rendering to represent a 3D object, according to an exemplary embodiment.

FIG. 8 is a diagram illustrating 3D image rendering to represent a 3D object, according to an exemplary embodiment. FIG. 8 illustrates a display panel 811, an optical layer 813, a virtual 3D object 820 and rays.

Because the optical layer 813 is located in front of the display panel 811, the optical layer 813 may correspond to a parallax barrier or a lenticular lens. For example, the optical layer 813 may be a directional BLU. In this example, the optical layer 813 may be located behind the display panel 811.

A 3D image rendering apparatus may assign an appropriate pixel value to each of subpixels of the display panel 811, in order to represent the virtual 3D object 820. For example, the 3D image rendering apparatus may determine candidate rays that pass through subpixels of the display panel 811 and optical elements of the optical layer 813, based on an arrangement of the display panel 811 and the optical layer 813. To prevent an error based on an approximate value, the 3D image rendering apparatus may determine the candidate rays based on a refractive index n1 of a first medium that is disposed between the display panel 511 and the optical layer 513 and a refractive index n2 of a second medium that is disposed outside a 3D display apparatus. The 3D image rendering apparatus may select a ray that propagates through the virtual 3D object 820 from among the candidate rays. Also, the 3D image rendering apparatus may assign a pixel value to a subpixel that outputs the selected ray so that the subpixel may represent an intersection point that is located between the selected ray and the virtual 3D object 820.

Figure 9:
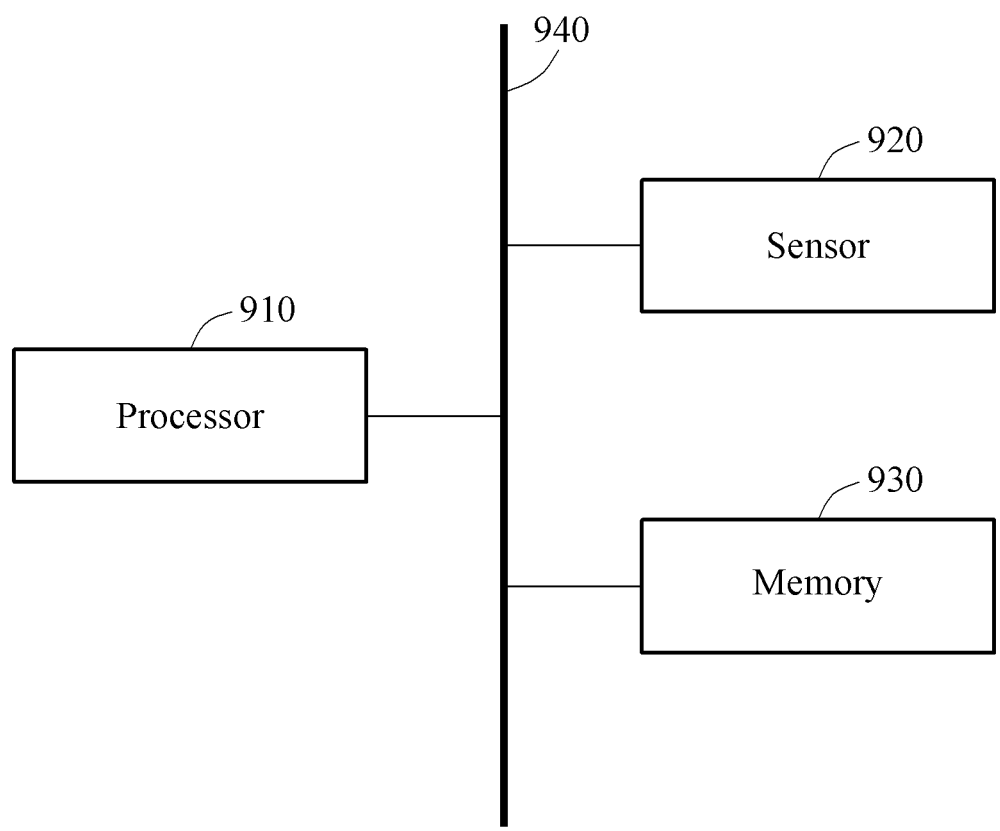
FIG. 9 is a block diagram illustrating a 3D image rendering apparatus, according to an exemplary embodiment.

FIG. 9 is a block diagram illustrating a 3D image rendering apparatus 900, according to an exemplary embodiment. Referring to FIG. 9, the 3D image rendering apparatus 900 includes a processor 910, a sensor 920 and a memory 930. The processor 910, the sensor 920 and the memory 930 may communicate with each other via a bus 940.

The sensor 920 may detect or track eyes of a user. The sensor 920 may include, for example, at least one of an image sensor, a proximity sensor and/or an infrared sensor. The sensor 920 may detect or track the eyes of a user based on a well-known scheme, for example, a scheme of converting an optical image into an electrical signal. The sensor 920 may transmit at least one of a captured color image, a depth image and/or an infrared image to at least one of the processor 910 or the memory 930.

The processor 910 may include at least one of the above-described apparatuses and/or may be configured perform at least one of the above-described methods. For example, the processor 910 may process the above-described operations associated with 3D image rendering. The processor 910 may determine candidate rays that pass through a subpixel of a display panel and candidate view fields included in a viewing zone, based on a first refractive index of a first medium that is disposed between the display panel and an optical layer and a second refractive index of a second medium that is disposed outside a 3D display apparatus, may determine intersection points that are located between the candidate rays and the optical layer, and may assign a pixel value to the subpixel based on respective distances between the intersection points and optical elements of the optical layer.

The memory 930 may be configured to store computer-readable instructions. When instructions stored in the memory 930 are executed by the processor 910, the processor 910 may process operations associated with 3D image rendering. Also, the memory 930 may store data associated with the above-described 3D image rendering.

The processor 910 may be configured to execute instructions or programs, and/or may be configured control the 3D image rendering apparatus 900. The 3D image rendering apparatus 900 may be connected to an external device (for example, a personal computer (PC) or a network) via an input/output device (not shown), and may exchange data with the external device. The 3D image rendering apparatus 900 may be implemented as at least a portion of, for example, any of a mobile device such as a mobile phone, a smartphone, a personal digital assistant (PDA), a tablet computer or a laptop computer, a computing device such as a PC or a netbook, and an electronic product such as a television (TV), a smart TV or a security device for gate control, and various electronic systems such as autonomous vehicles. Also, the 3D image rendering apparatus may be implemented as a portion of a heads up display (HUD). The above description is also applicable to the 3D image rendering apparatus 900, and accordingly is not repeated here.

Figure 10:
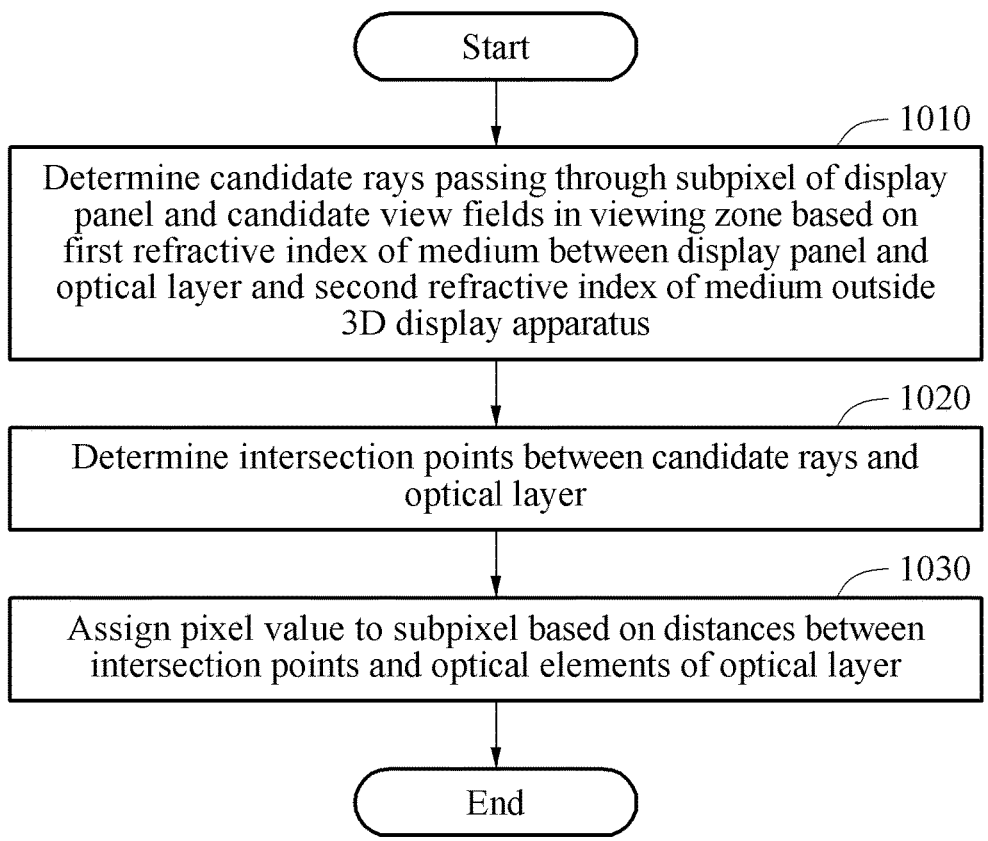
FIG. 10 is a flowchart illustrating an example of a 3D image rendering method, according to an exemplary embodiment.

FIG. 10 is a flowchart illustrating an example of a 3D image rendering method, according to an exemplary embodiment. Referring to FIG. 10, in operation 1010, a 3D image rendering apparatus determines candidate rays that pass through a subpixel of a display panel and candidate view fields included in a viewing zone, based on a first refractive index of a first medium that is disposed between the display panel and an optical layer and a second refractive index of a second medium that is disposed outside a 3D display apparatus. In operation 1020, the 3D image rendering apparatus determines intersection points that are located between the candidate rays and the optical layer. In operation 1030, the 3D image rendering apparatus assigns a pixel value to the subpixel based on respective distances between the intersection points and optical elements of the optical layer. The above description is also applicable to the 3D image rendering method of FIG. 10, and accordingly is not repeated here.

FIG. 11 is a flowchart illustrating another example of a 3D image rendering method, according to an exemplary embodiment. Referring to FIG. 11, in operation 1110, a 3D image rendering apparatus determines candidate rays that pass through a subpixel of a display panel and optical elements of an optical layer, based on a first refractive index of a first medium that is disposed between the display panel and the optical layer and a second refractive index of a second medium that is disposed outside a 3D display apparatus. In operation 1120, the 3D image rendering apparatus determines a ray that propagates through a viewing zone from among the candidate rays. In operation 1130, the 3D image rendering apparatus may assign a pixel value to the subpixel based on a position at which the determined ray and the viewing zone intersect. The above description is also applicable to the 3D image rendering method of FIG. 11, and accordingly is not repeated here.

The exemplary embodiments described herein may be implemented using hardware components, software components, or a combination thereof. A processing device may be implemented by using one or more general-purpose or special purpose computers, such as, for example, a processor, a controller and an arithmetic logic unit, a digital signal processor, a microcomputer, a field programmable array, a programmable logic unit, a microprocessor or any other device that is capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, a person having ordinary skill in the art will appreciate that a processing device may include multiple processing elements and multiple types of processing elements. For example, a processing device may include multiple processors or a processor and a controller. In addition, different processing configurations are possible, such as a configuration that implements parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave that is capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to persons having ordinary skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer by using an interpreter. The described hardware devices may be configured to act as one or more software modules in order to perform the operations of the above-described exemplary embodiments, or vice versa.

While the present disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each exemplary embodiment are to be considered as being applicable to similar features or aspects in other exemplary embodiments. Suitable results may be achieved if the described techniques are performed in a different order, and/or if components in a described system, architecture, device, or circuit are combined in a different manner and/or replaced or supplemented by other components or their equivalents. Therefore, the scope of the present disclosure is defined not by the detailed description, but by the claims and their equivalents, and all variations within the scope of the claims and their equivalents are to be construed as being included in the present disclosure.

What is claimed is:

1. A three-dimensional (3D) image rendering method comprising:
   determining a first virtual ray that propagates through a first pixel of a display panel and a first candidate view field included in a viewing zone based on a first refractive index of a first medium that is disposed between the display panel and an optical layer in a 3D display apparatus and a second refractive index of a second medium that is disposed outside the 3D display apparatus;
   determining a first intersection point between the determined first virtual ray and the optical layer; and
   determining a second virtual ray that propagates through the first pixel of the display panel and a second candidate view field included in the viewing zone based on the first refractive index and the second refractive index;
   determining a second intersection point between the determined second virtual ray and the optical layer;
   calculating a first distance between the first intersection point and an optical element of the optical layer closest to the first intersection point and a second distance between the second intersection point and an optical element of the optical layer closest to the second intersection point; and
   assigning a pixel value to the first pixel based on a comparison between the first distance and the second distance.

2. The 3D image rendering method of claim 1, wherein the determining of the first intersection point comprises determining the first intersection point based on an angle of incidence and an angle of refraction of the determined first virtual ray based on the first refractive index and the second refractive index.

3. The 3D image rendering method of claim 1, wherein the determining of the first intersection point comprises:
   calculating a distance between the first pixel and the first candidate view field on a two-dimensional (2D) plane based on a position of the first candidate view field and a position of the first pixel;
   calculating a distance between the first pixel and the first intersection point on the 2D plane based on the first refractive index and the second refractive index; and
   determining a position of the first intersection point based on the calculated distance between the first pixel and the first candidate view field and the calculated distance between the first pixel and the first intersection point.

4. The 3D image rendering method of claim 1, wherein each of the first candidate view field and the second candidate view field corresponds to at least one from among a left viewpoint for a single user, a right viewpoint for the single user, and a preset number of viewpoints for multiple views.

5. The 3D image rendering method of claim 1, wherein the assigning of the pixel value comprises:
   assigning, to the first pixel, a pixel value corresponding to the first candidate view field in response to the first distance being less than the second distance; and
   assigning, to the first pixel, a pixel value corresponding to the second candidate view field in response to the first distance being greater than the second distance.

6. A three-dimensional (3D) image rendering method comprising:
   determining candidate rays that propagate through a pixel of a display panel and optical elements of an optical layer based on a first refractive index of a first medium that is disposed between the display panel and the optical layer in a 3D display apparatus and a second refractive index of a second medium that is disposed outside the 3D display apparatus;
   selecting a ray that propagates through a viewing zone from among the determined candidate rays, the viewing zone comprising candidate view fields; and
   assigning a pixel value to the pixel based on a position at which the selected ray and the viewing zone intersect.

7. The 3D image rendering method of claim 6, wherein the selecting of the ray comprises, when at least two rays propagate through the viewing zone, selecting a ray that is nearest to a center of the viewing zone from among the at least two rays.

8. The 3D image rendering method of claim 6, wherein the assigning of the pixel value comprises, when no ray propagates through the viewing zone, assigning, to the pixel, one from among a lowest pixel value in a predetermined range and a pixel value of a viewpoint that corresponds to a nearest candidate view field to the candidate rays from among the candidate view fields included in the viewing zone.

9. The 3D image rendering method of claim 6, wherein each of the candidate view fields corresponds to at least one from among a left viewpoint for a single user, a right viewpoint for the single user, and a preset number of viewpoints for multiple views.

10. The 3D image rendering method of claim 6, wherein the assigning of the pixel value comprises:
determining a nearest view field to the position at which the determined ray and the viewing zone intersect; and
assigning, to the pixel, a pixel value of a viewpoint that corresponds to the determined view field.

11. A non-transitory computer-readable storage medium storing a program for causing a processor to perform the method of claim 1.

12. A three-dimensional (3D) image rendering apparatus comprising:
a processor; and
a memory configured to store at least one instruction that is readable by a computer,
wherein when the at least one instruction is executed by the processor, the processor is configured to:
determine a first virtual ray that propagates through a first pixel of a display panel and a first candidate view field included in a viewing zone based on a first refractive index of a first medium that is disposed between the display panel and an optical layer in a 3D display apparatus and a second refractive index of a second medium that is disposed outside the 3D display apparatus;
determine a first intersection point between the first virtual ray and the optical layer; and
determine a second virtual ray that propagates through the first pixel of the display panel and a second candidate view field included in the viewing zone based on the first refractive index and the second refractive index;
determine a second intersection point between the determined second virtual ray and the optical layer:
calculate a first distance between the first intersection point and an optical element of the optical layer closest to the first intersection point and a second distance between the second intersection point and an optical element of the optical layer closest to the second intersection point; and
assign a pixel value to the first pixel based on a comparison between the first distance and the second distance.

13. The 3D image rendering apparatus of claim 12, wherein the processor is further configured to determine the first intersection point based on an angle of incidence and an angle of refraction of the determined first virtual ray based on the first refractive index and the second refractive index.

14. The 3D image rendering apparatus of claim 12, wherein the processor is further configured to:
calculate a distance between the first pixel and the first candidate view field on a two-dimensional (2D) plane based on a position of the first candidate view field and a position of the first pixel;
calculate a distance between the first pixel and the first intersection point on the 2D plane based on the first refractive index and the second refractive index; and
determine a position of the first intersection point based on the calculated distance between the first pixel and the first candidate view field and the calculated distance between the first pixel and the first intersection point.

15. The 3D image rendering apparatus of claim 12, wherein each of the first candidate view field and the second candidate view field corresponds to at least one from among a left viewpoint for a single user, a right viewpoint for the single user, and a preset number of viewpoints for multiple views.

16. The 3D image rendering apparatus of claim 12, wherein the processor is further configured to:
assign, to the first pixel, a pixel corresponding to the first candidate view field in response to the first distance being less than the second distance; and
assign, to the first pixel, a pixel value corresponding to the second candidate view field in response to the first distance being greater than the second distance.

* * * * *